US009597923B2

(12) United States Patent
Wood et al.

(10) Patent No.: US 9,597,923 B2
(45) Date of Patent: Mar. 21, 2017

(54) WALLPAPER HANDLING DEVICE (71) Applicant: Andrew Wood, Yorkshire (GB)

(72) Inventors: Andrew Wood, Yorkshire (GB); Gary Fenton, West Yorkshire (GB)

(73) Assignee: Andrew Wood, Yorkshire (GB)

( * ) Notice: Subject to any disclaimer, the term of this patent is extended or adjusted under 35 U.S.C. 154(b) by 0 days.

(21) Appl. No.: 14/895,749

(22) PCT Filed: Jun. 2, 2014

(86) PCT No.: PCT/GB2014/051684
§ 371 (c)(1),
(2) Date: Dec. 3, 2015

(87) PCT Pub. No.: WO2014/195684
PCT Pub. Date: Dec. 11, 2014

(65) Prior Publication Data
US 2016/0107477 A1 Apr. 21, 2016

(30) Foreign Application Priority Data

Jun. 4, 2013 (GB) .................................. 1309924.7

(51) Int. Cl.
*B25J 1/04* (2006.01)
*B44C 7/06* (2006.01)
*B44C 7/02* (2006.01)

(52) U.S. Cl.
CPC *B44C 7/06* (2013.01); *B25J 1/04* (2013.01); *B44C 7/02* (2013.01)

(58) Field of Classification Search
CPC ....................................................... B44C 7/06

USPC ........ 294/209, 109, 210, 211; 156/576, 577, 156/71, 575, 579
See application file for complete search history.

(56) References Cited

U.S. PATENT DOCUMENTS

| 225,860 | A | * | 3/1880 | Pattison | B44C 7/02 118/235 |
| 308,382 | A | * | 11/1884 | Schock | B44C 7/06 156/576 |
| 323,991 | A | * | 8/1885 | Wilcox | B44C 7/06 156/576 |
| 387,792 | A | * | 8/1888 | McAfee | B44C 7/06 156/576 |

(Continued)

OTHER PUBLICATIONS

International Search Report, PCT/GB2014/051684, Andrew Wood, Aug. 18, 2014.

(Continued)

*Primary Examiner* — Paul T Chin
(74) *Attorney, Agent, or Firm* — Nyemaster Goode, P.C.

(57) ABSTRACT

A wallpaper handling device comprising a wallpaper support member having a first face for supporting a sheet of wallpaper and first and second sides extending therefrom; first and second clamps connected to the first and second sides respectively, each clamp comprising at least one clamping plate, the clamping plates of the two clamps extending inwardly towards each other over the first face, each clamp being adapted to be displaced between an open position in which the clamping plate is remote from the first face and a closed position in which the clamping plate abuts the first face so clamping a sheet of wallpaper between the first face and clamping plate.

11 Claims, 8 Drawing Sheets

(56) References Cited

U.S. PATENT DOCUMENTS

| | | | | |
|---|---|---|---|---|
| 398,154 | A | * | 2/1889 | Hartford ................ E04F 21/00 118/235 |
| 471,636 | A | * | 3/1892 | Graham .................... B44C 7/02 118/38 |
| 609,008 | A | | 8/1898 | Thomas |
| 1,331,436 | A | * | 2/1920 | Jensen ...................... B44C 7/06 156/576 |
| 1,348,290 | A | * | 8/1920 | Malacos ................... B44C 7/02 156/575 |
| 2,002,633 | A | * | 5/1935 | Greene ..................... B44C 7/08 156/576 |
| 2,097,660 | A | * | 11/1937 | Gordon ..................... B44C 7/06 156/576 |
| 2,224,911 | A | | 12/1940 | Harrison |
| 2,511,040 | A | * | 6/1950 | Boone ...................... B44C 7/06 156/576 |
| 2,974,717 | A | * | 3/1961 | Lindsay ............... G03D 15/043 156/251 |
| 4,210,485 | A | * | 7/1980 | Lake ........................ B44C 7/06 156/575 |
| 4,490,198 | A | | 12/1984 | Mitchell |

OTHER PUBLICATIONS

International Preliminary Report on Patentability, PCT/GB2014/051682, Andrew Wood, Aug. 18, 2014.
Written Opinion of the International Searching Authority, PCT/GB2014/051682, Andrew Wood, Aug. 18, 2014.

* cited by examiner

Figure 1

(Prior Art)

WALLPAPER HANDLING DEVICE

The present invention relates to a wallpaper handling device. More particularly, but not exclusively, the present invention relates to a wallpaper handling device comprising a first face for supporting a sheet of wallpaper and clamps connected to side faces extending from the first face, each clamp comprising a clamping plate adapted to be displaced between an open position remote from the first face and a closed position in which it abuts the first face so clamping wallpaper between the clamping plate and first face.

It is well known that hanging vertical strips of wallpaper can be difficult. This is particularly the case when the wall is taller than the decorator. In this case the procedure is quite complex. The decorator firstly applies paste to one side of the wallpaper strip and then folds the strip into a concertina. Then, whilst holding the folded strip in one hand the decorator climbs a ladder and pushes the end of the wallpaper strip into contact with the top of the wall. The decorator then slowly descends the ladder whilst both slowly unfolding the wallpaper strip and brushing the strip into contact with the wall. As is well known to anyone who has hung wallpaper this requires a high degree of manual dexterity. Further because the use of a ladder is required there are safety issues.

Devices are known which partially overcome this problem. In particular there is known a device comprising a clamp on the end of a long pole. The clamp clamps then end of the wallpaper strip. The clamp is then lifted by the pole and the end of the end of the wallpaper strip pushed against the wall, all whilst the decorator remains on the ground. A problem with such a device however is that the wallpaper is held in fixed relation to the clamp. When the clamp is raised the wallpaper may not be in correctly aligned with the adjacent strip of wallpaper. For example if the paper is patterned then the pattern on the strip may not be correctly aligned with the pattern on the adjacent strip. In this event the decorator has to take the device down, move the wallpaper slightly and try again. Often several attempts are necessary.

The device according to the invention seeks to overcome the problems of the prior art.

Accordingly, the present invention provides A wallpaper handling device comprising
  a wallpaper support member having a first face for supporting a sheet of wallpaper and first and second sides extending therefrom;
  first and second clamps connected to the first and second sides respectively, each clamp comprising at least one clamping plate, the clamping plates of the two clamps extending inwardly towards each other over the first face, each clamp being adapted to be displaced between an open position in which the clamping plate is remote from the first face and a closed position in which the clamping plate abuts the first face so clamping a sheet of wallpaper between the first face and clamping plate.

The wallpaper handling device according to the invention has the advantage that the clamps are connected to the sides rather than the wallpaper supporting first face. The clamps can therefore be displaced to the open position and the wallpaper strip moved slightly to align it with an adjacent strip and the clamps then closed, all whilst the device is in place against the wall.

The first face can be divided into at least two spaced apart sub faces.

Each clamp can be pivotally connected to its associated side so that the clamping plates are pivotally displaced between open and closed positions.

Alternatively, each clamp can be slideably connected to its associated side such that the clamping plates are slideably displaced between open and closed positions.

Preferably, the clamps are connected to a common handle for displacing the clamps between open and closed positions.

The first face can be curved.

Alternatively, the first face can comprise at least two planar portions inclined to each other, preferably by 90 degrees.

Preferably, the side faces are orthogonal to the first face.

Preferably, at least one clamp comprises a plurality of clamping plates adapted to abut the first face.

The wallpaper handling device according to the invention can further comprise a handle connected to the wallpaper support member.

Preferably, the clamps are biased in the closed position.

The present invention will now be described by way of example only and not in any limitative sense with reference to the accompanying drawings in which.

Figure 1:
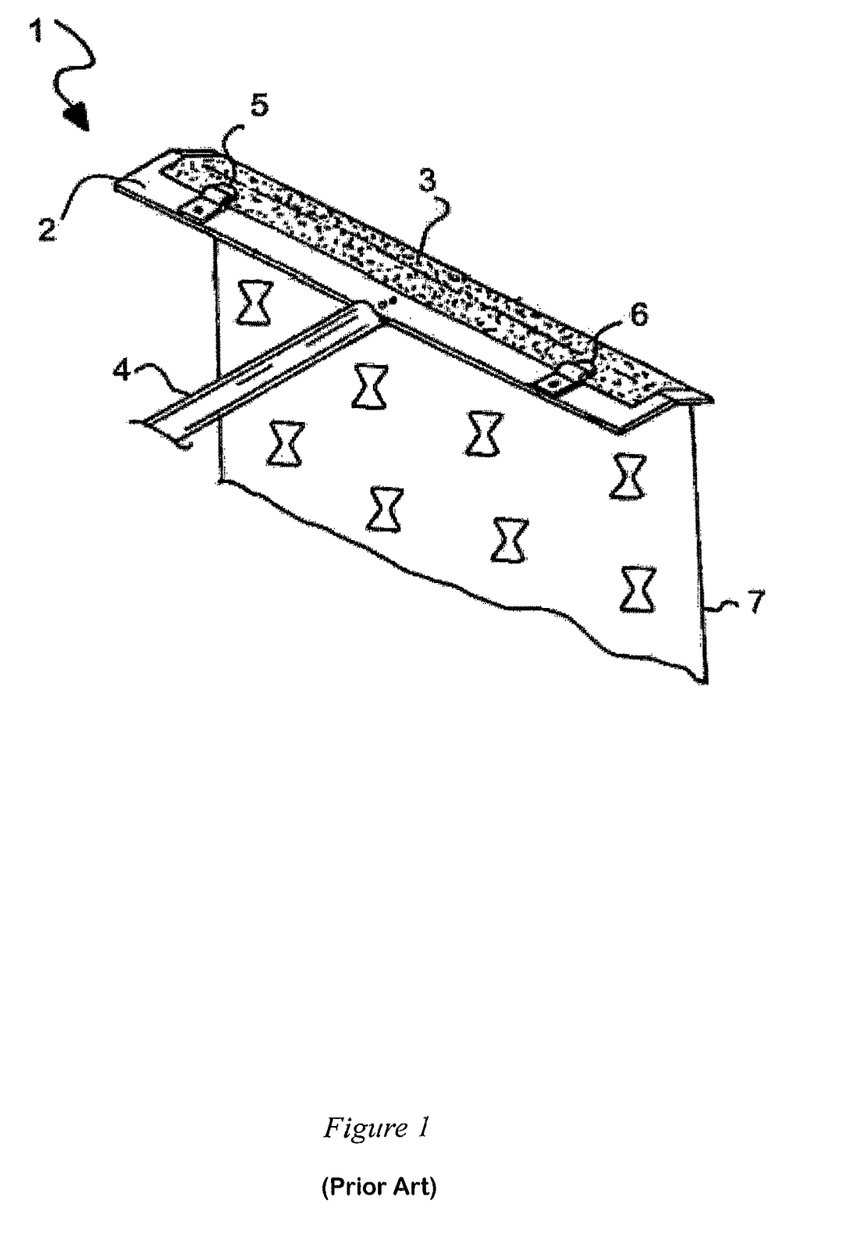
FIG. 1 shows, in perspective view, a known wallpaper hanging device.

Shown in FIG. 1 is a known wallpaper hanging device 1. The wallpaper hanging device 1 comprises a wallpaper support member 2 having a first face 3 for supporting a sheet of wallpaper. Connected to the wallpaper support member 2 is a long pole 4 for raising the wallpaper support member 2 to the top of a wall. Arranged on the first face 3 are first and second clips 5,6.

In use a strip of wallpaper 7 is pasted and arranged on the first face 3 paste side up. The wallpaper strip 7 is held in place by inserting the end of the wallpaper strip 7 into the clips 5,6 as shown. The first face 3 is then pushed up to the top of the wall and the wallpaper urged against the wall. The wallpaper that hangs down is then brushed into place on the wall with a decorating brush.

The problem with such a device is that the position of the wallpaper strip 7 cannot easily be adjusted with respect to the wallpaper support member 2. If, for example, when the strip 7 is hung it is found that it is not correctly aligned with the pattern on the adjacent strip of wallpaper then the device 1 has to be taken down. The end of the wallpaper strip 7 is cut off and the strip 7 then reconnected to the device 1. Then decorator then tries to hang the strip 7 again. This often has to be repeated a number of times before strip 7 is correctly aligned with respect to the adjacent strip. This is inconvenient and time consuming.

Figure 2:
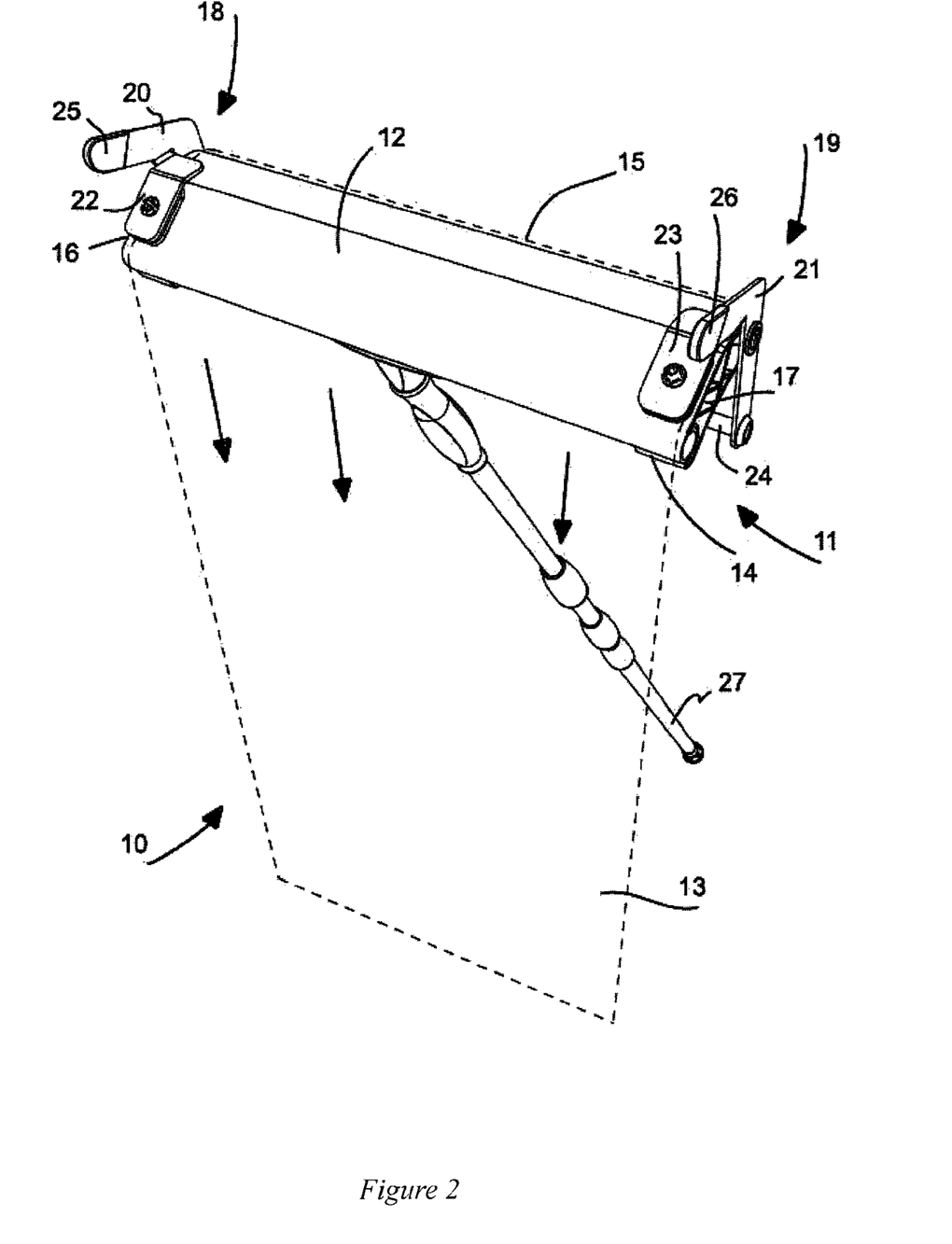
FIG. 2 shows, in perspective view, a first embodiment of a device according to the invention.

Shown in FIG. 2 in perspective view is a first embodiment of a wallpaper hanging device 10 according to the invention. The wallpaper hanging device 10 comprises a wallpaper support member 11 having a first face 12 for supporting a sheet of wallpaper 13. The first face 12 has a bottom edge 14 and a top edge 15. The wallpaper 13 extends from the bottom edge 14 to the top edge 15 as shown.

First and second sides 16,17 extend from the first face 12 as shown. The first and second sides 16,17 are substantially orthogonal to the first face 12.

Connected to each of the sides 16,17 are first and second clamps 18,19 as shown. Each clamp 18,19 comprises a support arm 20,21 pivotally connected to a side 16,17. Each support arm 20,21 has a clamp plate 22,23 extending therefrom. The two clamp plates 22,23 extend inwardly towards each other over the first face 12 as shown. Each clamp plate 22,23 is arranged to be adjacent and parallel to the first face 12. The two support arms 20,21 are connected together by a common handle 24. Also extending from each support arm 20,21 is a spacer arm 25,26, the function of which will be described below.

Also connected to the wallpaper support member 11 is a pole 27 for lifting the device 10 to the top of a wall.

Figure 3A:
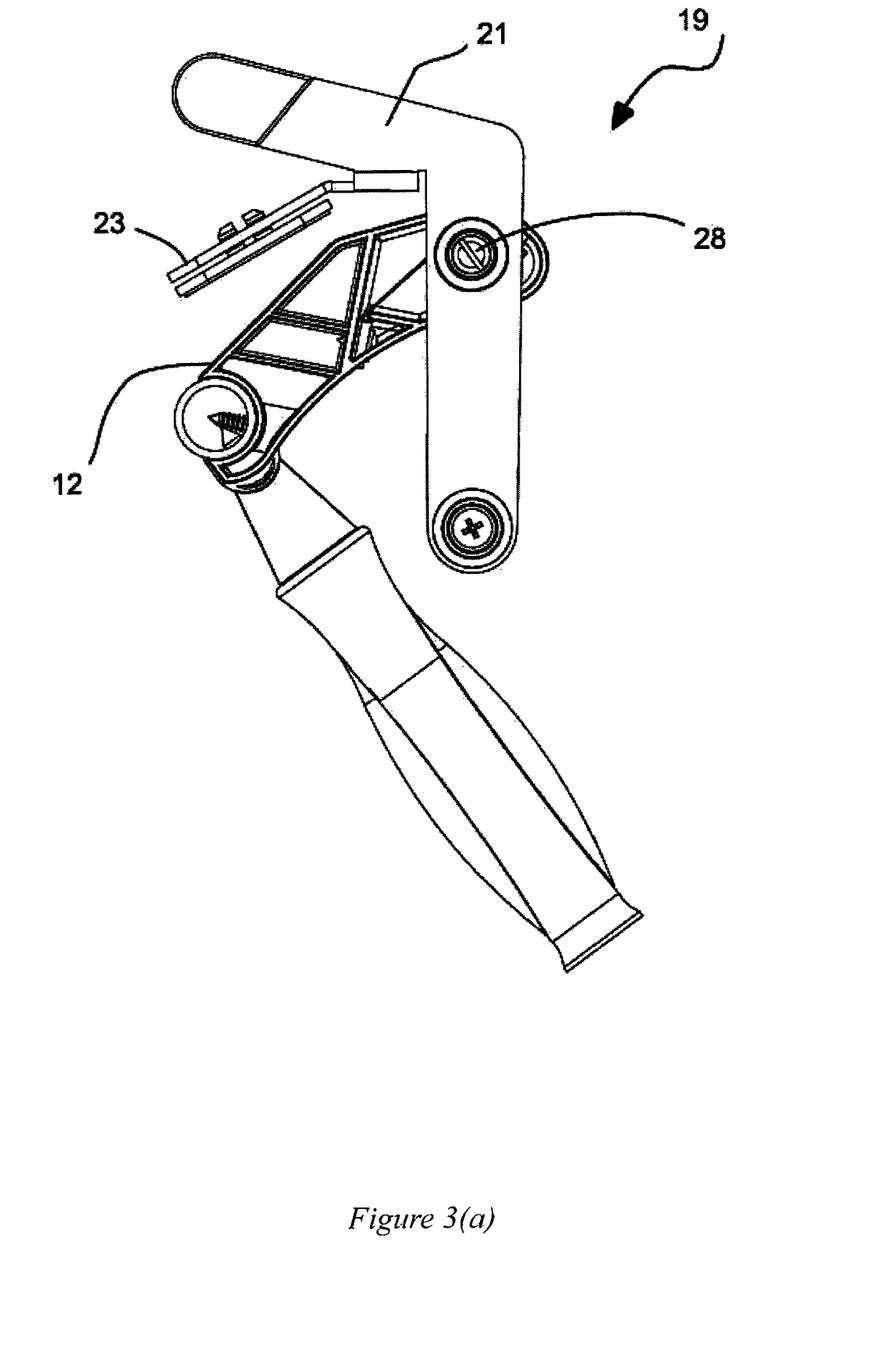
FIGS. 3(a) and 3(b) show, in side view, the operation of one of the clamps of the embodiment of FIG. 2.
Figure 3B:
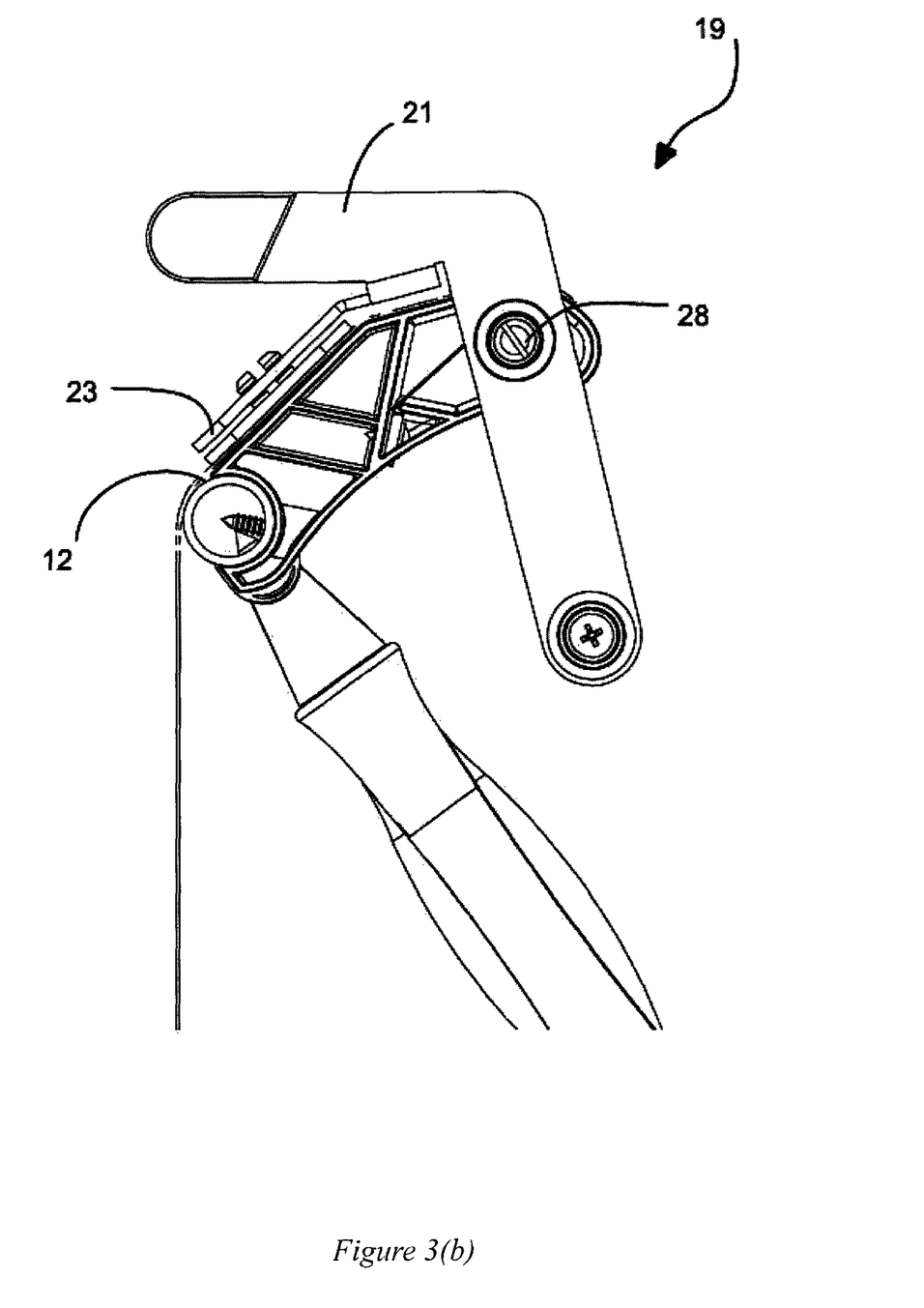

The operation of the clamps 18,19 is shown with reference to FIGS. 3(a) and 3(b). In FIG. 3(a) the clamp 19 is shown in the open position. In this position the clamp plate 23 is separated slightly from the first face 12 as shown. As the support arm 21 is pivoted about the pivot 28 the clamp face 23 abuts the first face 12 as shown in FIG. 3(b). In this position the clamp 19 is in the closed position. Preferably the clamp 19 is biased by a spring or the like (not shown) into the closed position.

The operation of the device 10 will now be described with reference to FIG. 2. In a first step the strip of wallpaper 13 is pasted on one side. The common handle 24 is displaced so pivoting the support arms 20,21 and lifting the clamp plates 22,23 from the first face 12. The wallpaper strip 13 is then arranged on the first face 12 as shown and the clamps 18,19 pivoted to the closed position, so gripping the wallpaper strip 13 in place.

Figure 4:
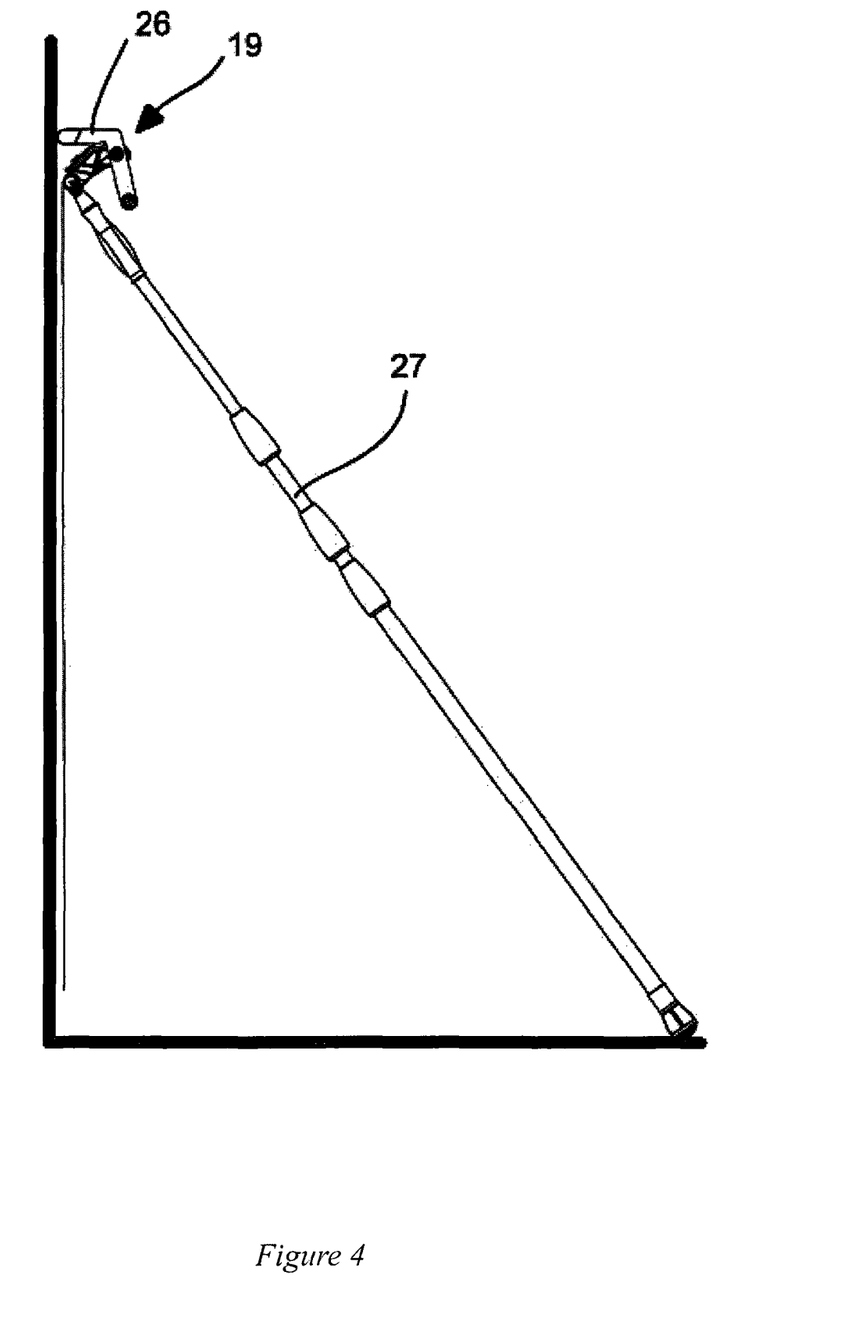
FIG. 4 shows the device of FIG. 2 in operation.

The device 10 is then lifted to the top of the wall and the wallpaper strip 13 at the bottom edge 14 of the first face 12 pushed against the wall. The bottom of the pole 27 remote from the wallpaper support member 11 is fixed in position on the floor so the decorator can then let go of the device 10. The bottom end of the pole 27 may be spring loaded to keep the pole 27 under compression. The wallpaper 13 which hangs down close to the wall is then brushed into contact with the wall. FIG. 4 shows the device 10 in this position. The ends of the two spacer arms 25,26 also abut the wall as shown so that the first face 12 is correctly oriented with respect to the wall. In this embodiment the first face 12 is inclined at 45 degrees to the wall when correctly oriented.

Once the wallpaper is correctly adhered to the wall the clamps 18,19 are pivoted to the open configuration and the device 10 removed. The very top of the wallpaper strip 13 is then adhered to the wall and cut to the correct length.

As with devices of the prior art the wallpaper may not be correctly aligned with an adjacent strip of wallpaper. In this event the handle 24 is moved slightly pivoting the clamps 18,19 slightly towards the open configuration. The decorator can then pull the wallpaper strip 13 from below The wallpaper strip 13 will slide along the first face 12 from the top edge 15 towards the bottom edge 14 (shown by the arrows). Once the wallpaper strip 13 is in the correct position with respect to the adjacent strip the handle 14 is released and the clamps 18,19 return the closed position clamping the wallpaper strip 13 in fixed position with respect to the first surface 12. The wallpaper hanging down from the device 10 can then be adhered to the wall as before.

Adjustment of the wallpaper strip in this way is possible because the clamps 18,19 are connected to the support member 11 at the sides 16,17 of the first face 12 and reach inwardly over the first face 12 towards each other. When the clamps 18,19 are in the open position the wallpaper strip 13 is free to be displaced on the first face 12 unimpeded by the clamps 18,19.

Figure 5:
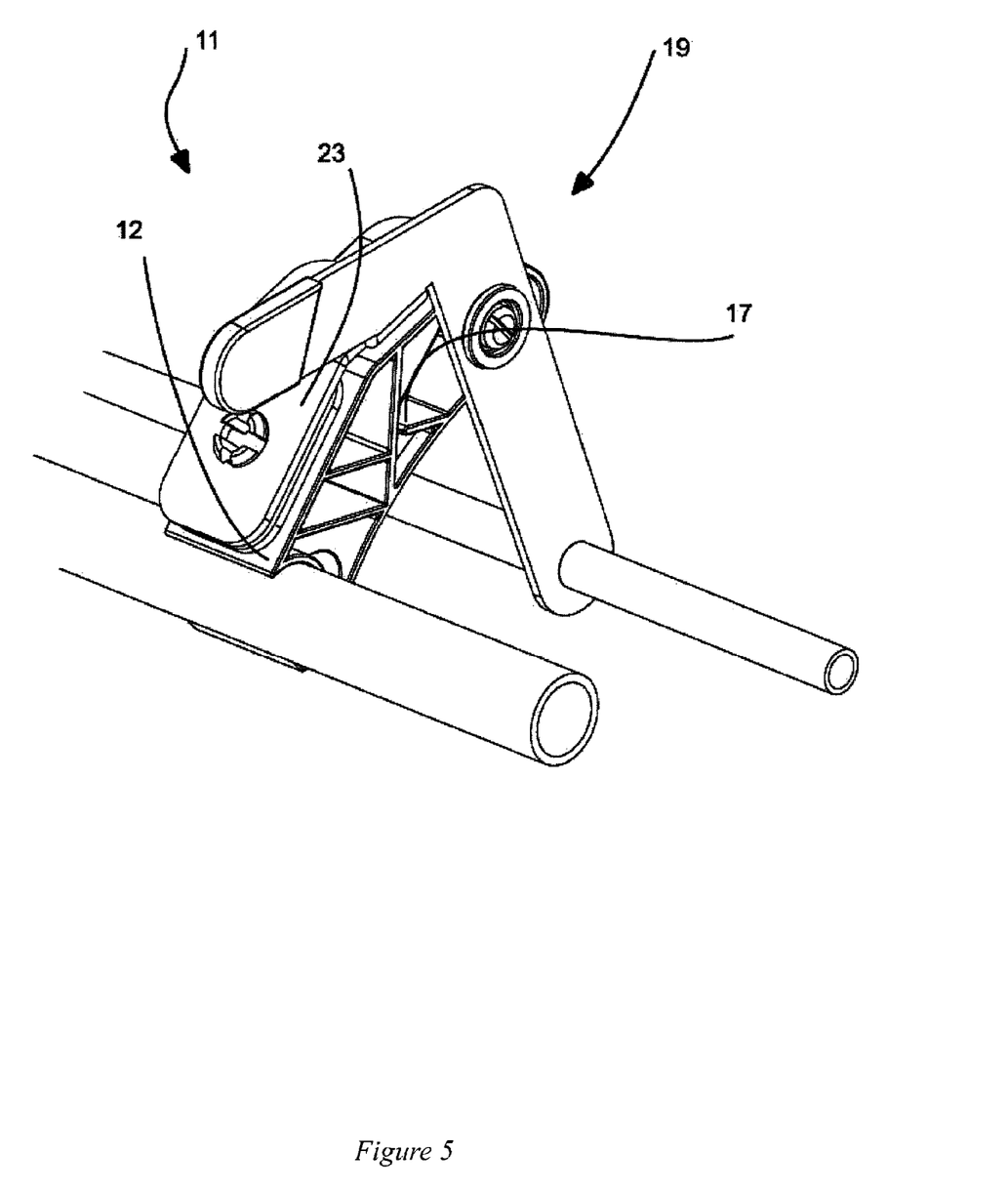
FIG. 5 shows a portion of the wallpaper support member of a further embodiment of a device according to the invention.

Shown in FIG. 5 is a portion of the wallpaper support member 11 of a further embodiment of a wallpaper handling device 10 according to the invention. In this embodiment the first face 12 is divided into two spaced apart sub faces, only one of which is shown. Each sub-face is adjacent to an opposite side 16,17. The bottom edge 14 extends between the two sides 16, 17 as shown for urging the wallpaper strip 13 into contact with the wall.

Figure 6:
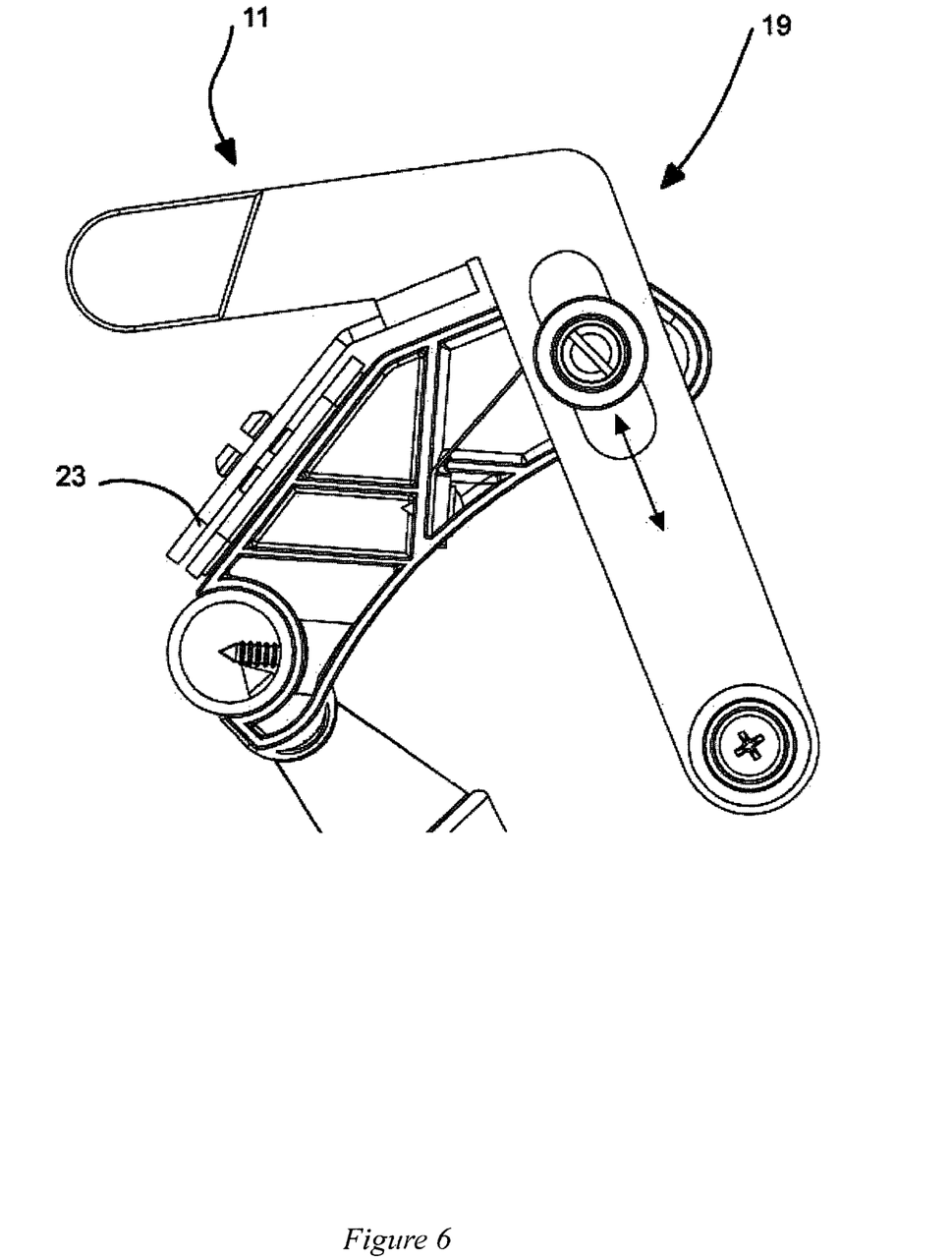
FIG. 6 shows a portion of the wallpaper support member of a further embodiment of a device according to the invention; and, FIG. 7 shows a portion of the wallpaper support member of a further embodiment of a device according to the invention.

Shown in FIG. 6 is a portion of the wallpaper support member 11 of a further embodiment of the invention. In this embodiment each clamp 18,19 is slideably connected to the wallpaper support member 11. The clamp plates 22,23 are slideable between open and closed positions.

Figure 7:
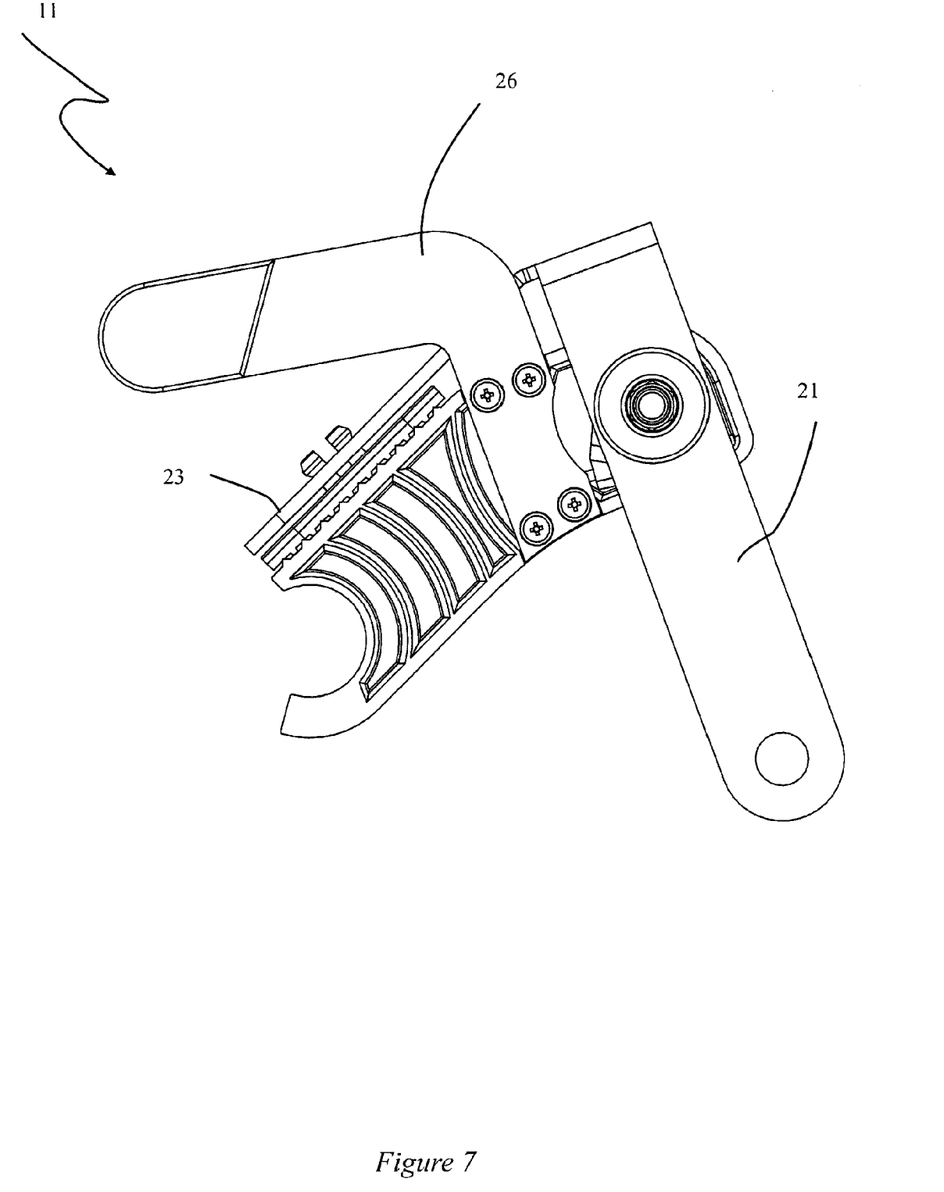

Shown in FIG. 7 is a portion of the wallpaper support member 11 of a further embodiment of the invention. In this embodiment the spacer arms 25,26 are fixedly connected to the first and second sides 16,17 rather than extending from the support arms 20,21.

The operation of the device 10 has been described with reference to hanging vertical strips of wallpaper on a vertical wall. The device 10 can also be used to hang wallpaper horizontally by feeding the wallpaper 13 onto the first face 12 perpendicular to the direction described previously ie from one clamp to another). The device 10 can also be used to hang wallpaper on a ceiling.

In a further embodiment of the invention (not shown) the first face 12 comprises two planar portions inclined at 90 degrees to each other. Each clamp 18,19 comprises two clamp plates 22,23. When the clamps 18,19 are pivoted to the closed position each clamp plate 22,23 abuts one of the planar portions.

In a further embodiment of the invention the first face 12 is curved.

The invention claimed is:

1. A wallpaper handling device comprising
a wallpaper support member having a first face for supporting a sheet of wallpaper across a top surface of the first face; the first face having first and second sides extending therefrom;
first and second clamps connected to the first and second sides respectively, each clamp comprising at least one clamping plate, the clamping plates of the two clamps extending inwardly towards each other over the first face, each clamp being configured to be displaced between an open position in which the clamping plate is remote from the first face and a closed position in which the clamping plate abuts the first face to clamp a sheet of wallpaper between the top surface of the first face and clamping plate.

2. A wallpaper handling device as claimed in claim 1, wherein the first face is divided into at least two spaced apart sub faces.

3. A wallpaper handling device as claimed in claim 1, wherein each clamp is pivotally connected to its associated side so that the clamping plates are pivotally displaced between open and closed positions.

4. A wallpaper handling device as claimed in claim 1, wherein each clamp is slideably connected to its associated side such that the clamping plates are slideably displaced between open and closed positions.

5. A wallpaper handling device as claimed in claim 1, wherein the clamps are connected to a common handle for displacing the clamps between open and closed positions.

6. A wallpaper handling device as claimed in claim 1, wherein the first face is curved.

7. A wallpaper handling device as claimed in claim 1, wherein the first face comprises at least two planar portions inclined to each other.

8. A wallpaper handling device as claimed in claimed 1, wherein the first and second sides are orthogonal to the first face.

9. A wallpaper handling device as claimed in claim 1, wherein at least one clamp comprises a plurality of clamping plates configured to abut the first face.

10. A wallpaper handling device as claimed in claim 1 further comprising a handle connected to the wallpaper support member.

11. A wallpaper handling device as claimed in claim 1, wherein the clamps are biased in the closed position.

* * * * *